United States Patent [19]
Vogt

[11] 3,727,990
[45] Apr. 17, 1973

[54] HYDRAULIC BRAKING SYSTEMS FOR VEHICLES

[75] Inventor: Hans Josef Vogt, Vallendar, Germany

[73] Assignee: Girling Limited, Birmingham, England

[22] Filed: Mar. 1, 1972

[21] Appl. No.: 230,750

[30] Foreign Application Priority Data

Mar. 19, 1971  Great Britain..................7,445/71

[52] U.S. Cl.................303/6 C, 137/38, 303/24
[51] Int. Cl................................B60t 8/14
[58] Field of Search............303/24, 6 C; 137/38; 188/349

[56] References Cited

UNITED STATES PATENTS 3,398,757  8/1968  Milster..................303/6 C
3,476,443  11/1969  Bratten..................188/349 X

*Primary Examiner*—Richard A. Schacher
*Attorney*—Samuel Scrivener, Jr. et al.

[57] ABSTRACT

A brake control unit for incorporation between an hydraulic master cylinder and a wheel brake actuator comprising an inertia-controlled valve member which is movable into engagement with a seating to cut-off communication between an inlet for connection to the master cylinder and an outlet for connection to the hydraulic actuator when the deceleration of the vehicle in which the unit is incorporated exceeds a predetermined value. The valve seating is movable between a first inoperative retracted position and a second operative advanced position, and means are incorporated for preventing the valve member from engagement with the seating unless the seating is in the advanced position.

6 Claims, 1 Drawing Figure

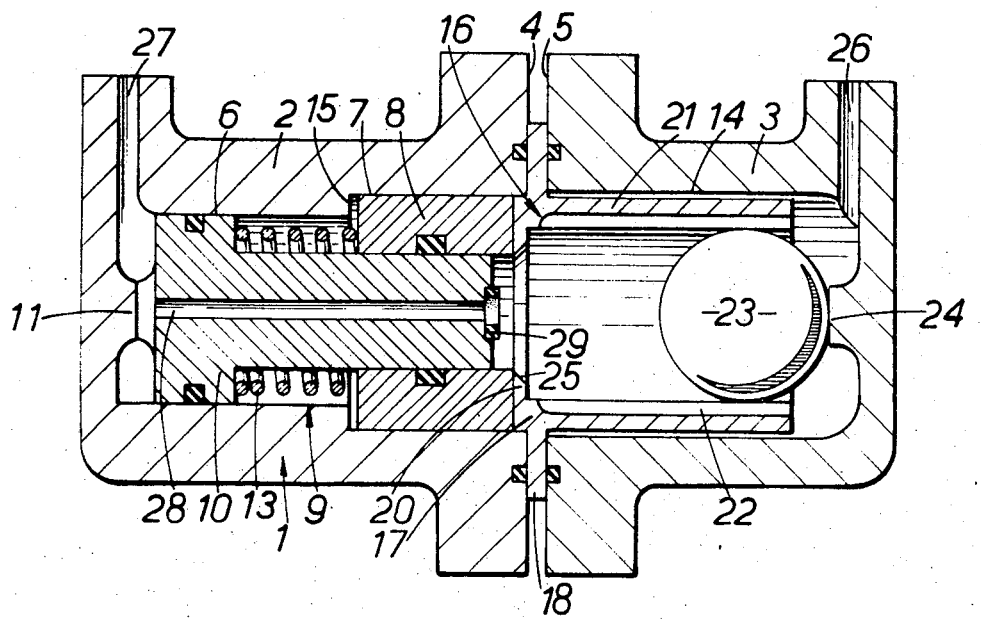

HYDRAULIC BRAKING SYSTEMS FOR VEHICLES

SPECIFIC DESCRIPTION

This invention relates to a new or improved brake control unit for incorporation between a master cylinder and an hydraulic actuator of a wheel brake in an hydraulic braking system for a vehicle, the control unit being of the kind comprising an inertia-controlled valve member which is movable into engagement with a seating to cut-off communication between an inlet for connection to the master cylinder and an outlet for connection to the hydraulic actuator when the deceleration of the vehicle in which the unit is incorporated exceeds a predetermined value.

In a braking system incorporating a brake control unit of the kind set forth when the vehicle is subjected to an excessive deceleration or when the control unit is tilted excessively due to deflections of the suspension of the vehicle there is a tendency for the valve member to engage with the seating to cut-off the supply of pressure fluid to the hydraulic actuator at least before a minimum braking pressure has been applied to the hydraulic actuator.

According to our invention in a brake control unit of the kind set forth the valve seating is movable between a first inoperative retracted position and a second operative advanced position, and means are incorporated for preventing the valve member engaging with the seating unless the seating is in the advanced position.

The seating is moved into the advanced position only after at least a minimum braking pressure has been applied to the outlet.

Conveniently a differential piston works in a complementary stepped bore in a housing and the seating surrounds a longitudinally extending bore in the piston and is located in the end of the piston which is of smaller area, the valve member being movable within a chamber in communication with the smaller end of the stepped bore and a stop being provided in the housing at a position to prevent the valve member from engaging with the seating unless the seating is disposed in the advanced position adjacent to the stop.

A spring normally acts on the differential piston to hold it in a retracted position towards the larger end of the bore with the seating spaced from the stop. When opposite ends of the piston are subjected to equal pressures, due to the differential areas of the ends of the piston, the piston is moved towards the smaller end of the bore to urge the seating into engagement with the valve member. Thus communication between the inlet and the outlet is cut-off.

The value of the pressure to which the piston is subjected to move it into the operative position is chosen to ensure that at least a minimum pressure is supplied to the hydraulic actuator before the seating can engage with the valve member. Thus the operation of the brake control unit is unaffected by excessive vehicle decelerations or suspension deflections.

One embodiment of our invention is illustrated in the accompanying drawing which is a longitudinal section through a brake control unit in accordance with our invention.

In the control valve illustrated in the accompanying drawings 1 is a housing which is constructed from complementary housing parts 2 and 3 of which adjacent end faces 4 and 5 are clamped together. The housing part 2 is provided with a longitudinal bore 6 which extends inwardly from its inner end, and the bore 6 is counter-bored at 7 to receive an annular sleeve 8 of an internal diameter less than that of the bore 6. The internal surface of the sleeve 8 and the bore 6 define a stepped bore 9 in which works a differential piston 10. The differential piston 10 is normally urged towards a stop 11 at the closed outer end of the housing part 2 by means of a compression spring 13 acting between the portion of the piston 10 which is of greater diameter and the adjacent end of the sleeve 8.

The housing part 3 is provided with a longitudinal bore 14 concentric with and of a diameter substantially equal to that of the counterbore 7.

The sleeve 8 is of an axial length slightly less than that of the counterbore 7 and is preferably clamped against a shoulder 15 in the housing part 2 at a step in the change in diameter between the bore 6 and the counterbore 7 by means of a stop member 16. The stop member 16 comprises an axially extending collar 17 formed at an intermediate point in its length with an outwardly directed radial flange 18 which is clamped between, and in sealing engagement with, the adjacent end faces of the housing parts 2 and 3, and an inwardly directed radial flange 20 which engages with the outer end of the sleeve 8 to clamp the sleeve 8 against the shoulder 15. The internal diameter of the flange 20 is substantially equal to that of the sleeve 8.

A sleeve 21 is carried by or is integral with the end face of the collar 18 remote from the sleeve 8 and extends axially into the bore 14 in the housing part 3. A series of circumferentially spaced ribs 22 formed in the internal face of the sleeve 21 define tracks between which is guided an inertiacontrolled valve member in the form of a ball 23 located within the bore 14 which defines a chamber. The ball 23 is movable in the chamber 14 on the tracks 22 through an axial distance between the stop member 16 and a stop 24 at the closed end of the housing part 3. As illustrated, the innermost end of the face of the flange 20 remote from the sleeve 8 is of discontinuous arcuate outline concentric with and equal in diameter to that of the ball 23 to form a stop face 25 with which the ball 23 is adapted to engage. Gaps in the stop face 25 provide passages for fluid when the ball is in engagement with the stop face.

The closed outer end of the housing part 3 is formed with a radial passage 26 communicating with the bore 14, and the closed outer end of the housing part 2 is formed with a radial passage 27. Normally the passages 26 and 27 are in communication through a longitudinally extending axial bore 28 in the piston 10, and a valve seating 29 surrounding the bore 28 is provided at the inner end of the piston 10 which is of smaller diameter.

The brake control unit is mounted in a vehicle in an inclined position with the closed end of the housing portion 11 at the forward end. The passage 27 is connected to hydraulic actuators of wheel brakes, normally the brakes on the rear wheels of the vehicle.

In the normal "off" position of brakes the components of the control unit assume the positions shown in the drawings with the ball 23 spaced from the seating 29 and resting against the stop 24 under the influence of gravity, and the differential piston 10 urged into engagement with the stop 11 by the force in the spring 13.

When the master cylinder is operated to apply the brakes and the deceleration of the vehicle is below a predetermined value required to cause the ball 23 to engage with the seating 29, fluid under pressure is delivered to the brake actuators through the chamber 14, the axial bore 28 in the piston 10, the bore 6, and the outlet passage 27. At the same time the master cylinder pressure is acting on the smaller end of the differential piston 10 and the pressure applied to the brakes is acting on the larger end. So long as the ball 23 does not engage with the seating 29 these pressures are equal. Owing to the differential areas of the two ends of the piston 10, the piston 10 is moved progressively towards the smaller end of the stepped bore in response to increases in pressure and against the action of the spring 13 in which energy is stored until the smaller end of the piston 10 is substantially aligned with the stop face 25. When this occurs a predetermined minimum pressure is applied to the outlet passage 27.

When the deceleration of the vehicle exceeds the predetermined value the ball 23 moves into engagement with the seating 29 and cuts off direct communication between the master cylinder and the brake actuators, at the same time engaging with, or being placed in close proximity to, the stop face 25.

Any increase in the pressure of the fluid supplied by the master cylinder then acts on the smaller end of the differential piston 10 and, with the assistance of the spring 13, moves the piston 10 towards the larger end of the stepped bore 9 against the pressure already existing in the larger end of the bore 9 which is the pressure applied to the hydraulic actuators. During this movement of the piston 10 the ball is in engagement, or engages, with the stop face 25. Thus the valve seating 29 moves out of engagement with the ball 23 so that the increased master cylinder pressure is applied to the brake actuators through the axial bore 28 in the piston 10 and the rear wheel brakes are re-applied automatically.

The increased pressure applied to the brakes also acts on the opposite end of the differential piston 10 and, owing to the differential areas of the two ends of the piston 10, causes the piston 10 to move towards the smaller end of the stepped bore 9 with the result that the seating 29 engages with the ball 23 to cut-off again the supply of pressure fluid to the brake actuators.

The sequence of operations described above is repeated automatically upon each successive increase in master cylinder pressure during any one brake application, and each successive re!-application of the rear wheel brakes takes place at a progressively increased pressure.

The ball 23 may move towards the seating 29 under the influence of forces other than those produced when the deceleration of the vehicle, in response to a brake application, exceeds a predetermined value. For example the ball 23 may move towards the seating 29 when the control unit is tilted excessively due to deflections of the suspension of the vehicle in which it is installed. Alternatively the ball 23 may move towards the seating 29 due to the impingement on the ball 23 of high pressure fluid when the master cylinder is operated rapidly. In either of these cases movement of the ball 23 towards the seating 29 is arrested by the provision of the stop face 25 which prevents the ball 29 from engaging with the seating 29 which, at that time, is disposed in the retracted position shown in the drawings by the force in the spring 13 holding the differential piston 10 against the stop at the closed end of the stepped bore 9.

When the ball 23 engages with the stop face 25 due to the influence of suspension movements when the brake is applied by operation of the master sylinder, fluid under pressure passes to the brake actuators of the rear wheel brakes through the axial bore 28 in the piston 10. The brakes are applied until the hydraulic pressures which acts on opposite ends of the differential piston 10 attains a value sufficient to apply to the piston 10, due to the differential areas of the ends of the piston 10, a force of a magnitude sufficient to move the piston 10 towards the smaller end of the stepped bore 9 and urge the seating 29 into engagement with the ball 23. The supply of fluid to the brake actuators is thus cut-off. Any subsequent increase in the applied fluid pressure from the master cylinder applied to the smaller end of the piston 10 serves to re-apply the brakes in successive stages as described above.

Should the ball 23 move towards the seating 29 due to the effect of high pressure fluid from the master cylinder, such high pressure fluid is supplied to that brake actuators through the axial bore 28 until that pressure attains a value sufficient to cause the differential piston 10 to move towards the smaller end of the stepped bore 9 so that the seating 29 engages with the ball 23 to cut off the supply of pressure fluid to the actuators of the rear brakes. Thereafter re-application of the brakes in response to further increase in master cylinder pressure takes place as described above.

The value of the pressure at which the seating 29 is operative to engage with the ball 23 is chosen to be consistent with subjecting the vehicle to the said predetermined value of deceleration at which the ball 23 would normally be urged towards the seating 29 under the influence of inertial forces.

I claim:

1. A brake control unit for incorporation between a master cylinder and an hydraulic actuator of a wheel brake in an hydraulic braking system, said control unit comprising a housing having an inlet for connection to a master cylinder and an outlet for connection to an hydraulic actuator, a valve seating in said housing located between said inlet and said outlet, and an inertia-controlled valve member movable into engagement with said seating to cut-off communication between said inlet and said outlet, when the deceleration of a vehicle in which said unit is incorporated exceeds a predetermined value, wherein said valve seating is movable between a first inoperative retracted position and a second operative advanced position, and means are incorporated for preventing said valve member from engaging with said seating unless said seating is in said advanced position.

2. A brake control unit as claimed in claim 1, wherein said housing incorporates a stepped bore, and a differential piston works in said stepped bore and is provided with a longitudinally extending bore, and wherein said seating is located in an end of said piston which is of smaller area, and means are incorporated to define a chamber in said housing in communication with an end of said stepped bore which is of smaller area, said valve member being movable within said chamber, and a stop being provided in said housing at a position to prevent said valve member from engaging with said seating unless said seating is disposed in said advanced position adjacent to said stop.

3. A brake control unit as claimed in claim 2, wherein said stop comprises a stop face in said housing at said smaller area end of said stepped bore.

4. A brake control unit as claimed in claim 3, wherein said inertia-controlled valve member comprises a ball, and said stop face is of arcuate outline concentric with and equal in diameter to that of said ball.

5. A brake control unit as claimed in claim 3, wherein said stop face is provided within gaps defining passages for fluid from said inlet to act on said end of said piston which is of smaller area when said inertia-controlled valve member is in engagement with said stop face.

6. A brake control unit as claimed in claim 2, wherein a spring normally acts on said differential piston to hold it in a retracted position towards an end of said bore which is of greater area with said seating positioned in said first inoperative position in which said seating is spaced from said stop.

* * * * *